(12) United States Patent
Chen et al.

(10) Patent No.: US 11,452,376 B2
(45) Date of Patent: Sep. 27, 2022

(54) FURNITURE ASSEMBLY AND MOUNTING DEVICE AND MOUNTING METHOD THEREOF

(71) Applicants: King Slide Works Co., Ltd., Kaohsiung (TW); King Slide Technology Co., Ltd., Kaohsiung (TW)

(72) Inventors: Ken-Ching Chen, Kaohsiung (TW); Fang-Cheng Su, Kaohsiung (TW); Ci-Bin Huang, Kaohsiung (TW); Yue-Hua Tang, Kaohsiung (TW); Chun-Chiang Wang, Kaohsiung (TW)

(73) Assignees: King Slide Works Co., Ltd., Kaohsiung (TW); King Slide Technology Co., Ltd., Kaohsiung (TW)

( * ) Notice: Subject to any disclaimer, the term of this patent is extended or adjusted under 35 U.S.C. 154(b) by 92 days.

(21) Appl. No.: 16/928,304

(22) Filed: Jul. 14, 2020

(65) Prior Publication Data
US 2021/0259418 A1    Aug. 26, 2021

(30) Foreign Application Priority Data
Feb. 25, 2020 (TW) .................................. 109106364

(51) Int. Cl.
*A47B 88/95* (2017.01)
*A47B 88/90* (2017.01)
*F16B 12/02* (2006.01)

(52) U.S. Cl.
CPC ............ *A47B 88/95* (2017.01); *A47B 88/941* (2017.01); *F16B 12/02* (2013.01); *A47B 2088/952* (2017.01)

(58) Field of Classification Search
CPC ..... A47B 88/95; A47B 88/941; A47B 88/956; A47B 2088/902; A47B 2088/951; A47B 2088/952; A47B 2088/953; A47B 2088/954; A47B 2088/955; F16B 12/02
See application file for complete search history.

(56) References Cited

U.S. PATENT DOCUMENTS

| | | | | |
|---|---|---|---|---|
| 3,926,491 A | * | 12/1975 | Greer ................... | A47B 88/941 312/351 |
| 4,011,706 A | * | 3/1977 | Dupree .............. | A47B 88/9412 52/285.3 |
| 4,042,288 A | * | 8/1977 | Litchfield ............ | A47B 88/941 160/381 |
| 4,099,815 A | * | 7/1978 | Cox ..................... | A47B 88/941 403/295 |
| 4,162,114 A | * | 7/1979 | Litchfield ............ | A47B 88/941 312/348.1 |

(Continued)

FOREIGN PATENT DOCUMENTS

CN  101951807 A  1/2011
WO  WO2009111807 A2  9/2009

*Primary Examiner* — Patrick D Hawn
(74) *Attorney, Agent, or Firm* — Alan D. Kamrath; Karin L. Williams; Mayer & Williams PC

(57) ABSTRACT

A mounting device is configured to mount a panel to a wall of an object. The mounting device includes a mounting member and an auxiliary member. The mounting member is configured to be mounted to the panel, and the mounting member is arranged with at least one coupling device. The at least one coupling device is configured to connect the panel to the wall. The auxiliary member is configured to cover at least one predetermined portion of the mounting member.

10 Claims, 9 Drawing Sheets

(56) References Cited

U.S. PATENT DOCUMENTS

| | | | | |
|---|---|---|---|---|
| 5,163,774 | A * | 11/1992 | Lautenschlager | A47B 88/956 403/245 |
| 5,505,554 | A * | 4/1996 | Lautenschlager | F16B 9/058 411/84 |
| 5,813,738 | A * | 9/1998 | Cheng | A47B 47/00 312/265.5 |
| 5,895,103 | A * | 4/1999 | Huber | A47B 88/95 312/348.4 |
| 6,179,399 | B1 * | 1/2001 | Brustle | A47B 88/95 312/348.4 |
| 6,474,901 | B1 * | 11/2002 | Thurston | F16B 12/50 403/381 |
| 8,297,724 | B2 * | 10/2012 | Hammerle | A47B 88/956 312/265.5 |
| 8,931,862 | B2 * | 1/2015 | Grimm | A47B 88/944 312/348.4 |
| 8,950,051 | B2 * | 2/2015 | Kampf | H04Q 1/06 174/101 |
| 9,386,848 | B2 * | 7/2016 | Holzapfel | A47B 88/95 |
| 9,826,829 | B2 * | 11/2017 | Sitton | A47B 87/008 |
| 9,943,167 | B2 | 4/2018 | Lucas | |
| 10,709,264 | B1 * | 7/2020 | Nagel | A47F 1/126 |
| 10,820,696 | B2 * | 11/2020 | Chen | F16B 12/50 |
| 10,881,204 | B2 * | 1/2021 | Chen | A47B 88/941 |
| 11,161,673 | B2 * | 11/2021 | Wines | A47B 47/0075 |
| 11,202,505 | B2 * | 12/2021 | Kampl | A47B 88/944 |
| 2013/0154463 | A1 | 6/2013 | Henscheid et al. | |
| 2014/0167586 | A1 * | 6/2014 | Schallert | A47B 88/40 312/330.1 |
| 2014/0184047 | A1 * | 7/2014 | Grimm | A47B 88/944 312/319.1 |
| 2016/0095435 | A1 | 4/2016 | Lucas | |
| 2020/0345141 | A1 * | 11/2020 | Kampl | A47B 88/95 |

* cited by examiner

FURNITURE ASSEMBLY AND MOUNTING DEVICE AND MOUNTING METHOD THEREOF

BACKGROUND OF THE INVENTION

1. Field of the Invention

The present invention relates to a mounting device, and more particularly, to a mounting device and a mounting method for furniture assembly.

2. Description of the Prior Art

U.S. Pat. No. 9,943,167B2 discloses a side covering element for a drawer panel. The drawer panel includes at least one holding bracket 17, one holding rail 23 and two mounting locations 32a, 32b. On the other hand, the side covering element 21 has a base section 41 and a rail section 42 substantially perpendicularly connected to each other, and two mounting projections 43a, 43b. The base section 41 of the side covering element 21 has a push-in tongue 50 configured to be inserted into the holding rail 23, and another push-in tongue 51 configured to be inserted into the holding bracket 17. Each mounting projection has two clamping jaws 44a, 44b or 45a, 45b. In addition, the two mounting locations 32a, 32b of the drawer panel are configured to receive and install the two mounting projections 43a, 43b. Two fixing screws 57a, 57b are screwed into a space between the two clamping jaws 44a, 44b or 45a, 45b, such that the two clamping jaws 44a, 44b or 45a, 45b are relatively moved to abut against inner sides of the two mounting locations 32a, 32b respectively, so as to achieve clamping installation. However, such installation may directly expose the fixing screws 57a, 57b (as shown in FIG. 1 of the case) on the inner surface of the drawer panel, which is not good for appearance and easy to damp. On the other hand, if the fixing screws 57a, 57b are not tightly fastened or are loosened, the two clamping jaws 44a, 44b or 45a, 45b may not provide sufficient clamping force, such that the stability of the side covering element 21 being installed on the side of the drawer panel is affected.

Therefore, for different market requirements, it is important to develop various products which are more reliable in installation operation.

SUMMARY OF THE INVENTION

The present invention relates to a mounting device, and more particularly, to a mounting device and a mounting method for furniture assembly.

According to an embodiment of the present invention, a furniture assembly comprises a panel, a mounting member and at least one fastening member. The panel comprises a first predetermined part and a second predetermined part. The first predetermined part comprises an extended section and a supporting section. The extended section is extended from the panel. The supporting section is located adjacent to the extended section. The mounting member is configured to be mounted to the panel. The mounting member comprises a first supporting part and a second supporting part. The first supporting part is configured to abut against the supporting section of the first predetermined part of the panel. The second predetermined part of the panel has a supporting surface configured to support the second supporting part. The at least one fastening member is configured to connect the mounting member to the panel.

Preferably, the at least one fastening member comprises a first fastening member, and the extended section of the first predetermined part of the panel is arranged with a first corresponding feature configured to fasten the first fastening member to one side of the panel.

Preferably, the at least one fastening member further comprises a second fastening member. The second predetermined part of the panel is arranged with a second corresponding feature configured to fasten the second fastening member to the side of the panel.

Preferably, the first fastening member is transversely fastened to the first corresponding feature.

Preferably, the second fastening member is transversely fastened to the second corresponding feature.

Preferably, the furniture assembly further comprises a furniture side wall and at least one coupling device longitudinally connected to the mounting member. The at least one coupling device is configured to connect the panel to the furniture side wall.

Preferably, the supporting surface of the second predetermined part is transversely arranged on the panel.

Preferably, the furniture assembly further comprises an auxiliary member configured to be connected to at least one of the mounting member and the panel. The auxiliary member and the mounting member form a mounting device. The auxiliary member comprises at least one flexible part having a first surface, and the first surface is arranged with a buckling section configured to buckle the mounting member.

Preferably, the at least one flexible part further has a second surface opposite to the first surface, and the second surface is arranged with a holding section configured to abut against the panel.

Preferably, the auxiliary member is formed with a mounting space configured to accommodate at least one predetermined portion of the mounting member.

Preferably, the auxiliary member comprises a plurality of walls defining the mounting space. The at lease one flexible part is arranged on one of the walls.

Preferably, the panel further comprises at least one mounting part, and the auxiliary member further comprises at least one connecting part configured to be correspondingly connected to the at least one mounting part.

According to another embodiment of the present invention, a mounting device comprises a mounting member and an auxiliary member. The mounting member configured to be mounted to one side of a panel. The mounting member as arranged with at least one coupling device configured to connect the panel to a wall of an object. The auxiliary member is configured to cover at least one predetermined portion of the mounting member According to another embodiment of the present invention, a mounting method for furniture assembly comprises providing a mounting member mounted to one side of a panel of a furniture assembly, wherein the mounting member is arranged with at least one coupling device; providing an auxiliary member configured to cover the mounting member and the side of the panel; and mounting the panel to a wall of the furniture assembly through the at least one coupling device.

These and other objectives of the present invention will no doubt become obvious to those of ordinary shill in the art after reading the following detailed description of the preferred embodiment that is illustrated in the various figures and drawings.

DETAILED DESCRIPTION

Figure 1:
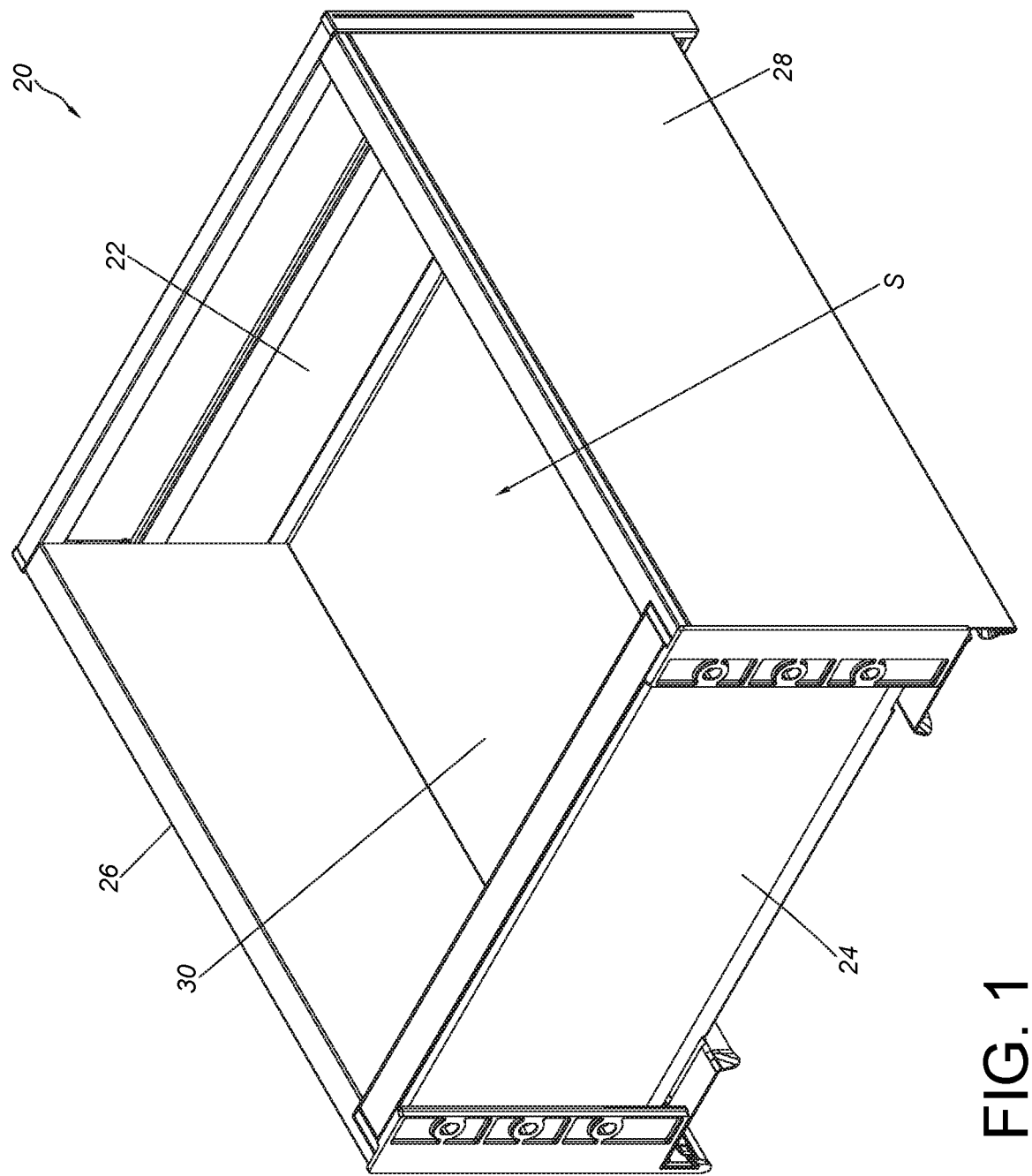
FIG. 1 is a diagram showing an object according to an embodiment of the present invention.
Figure 2:
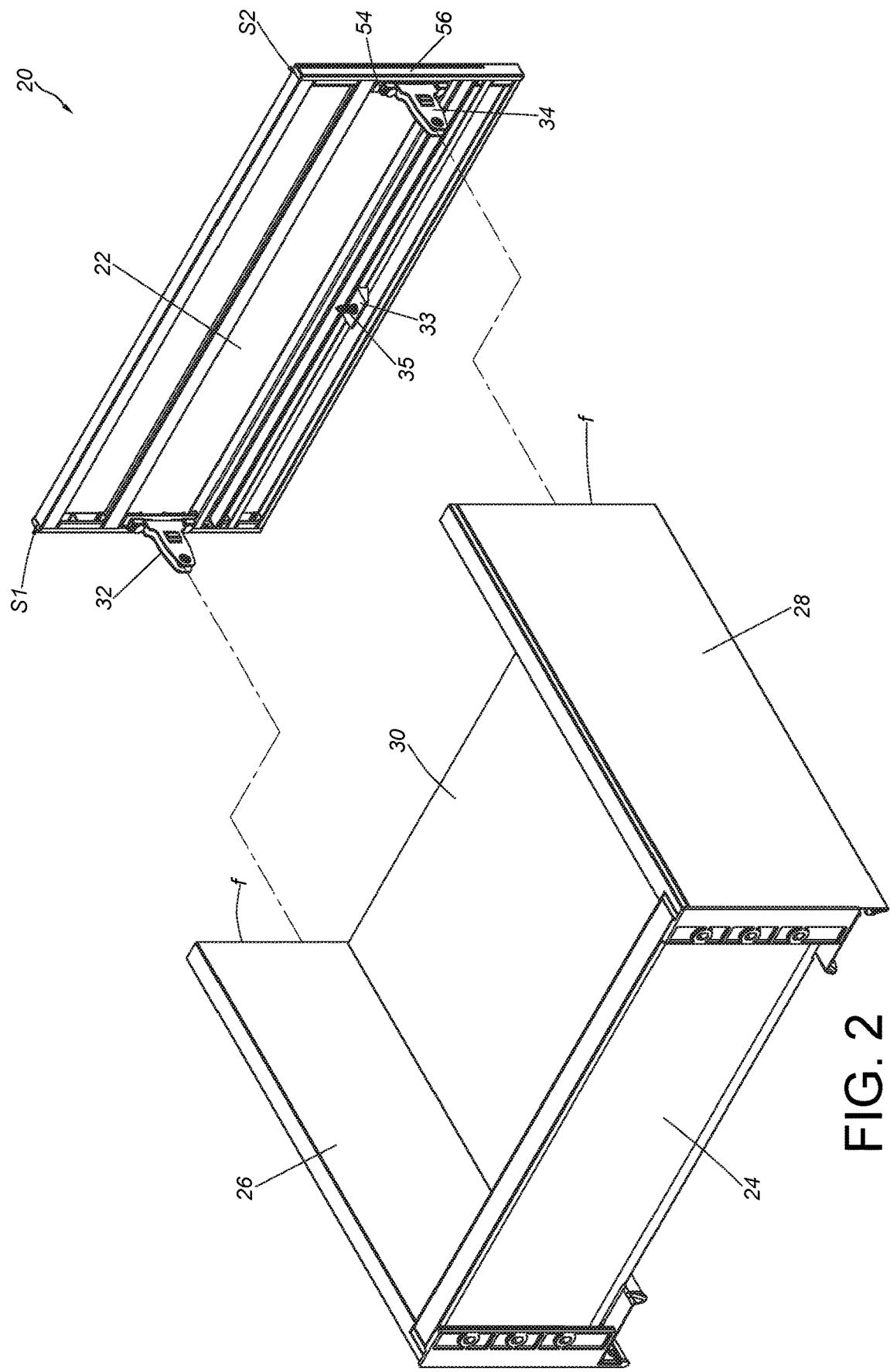
FIG. 2 is exploded view of a panel and a main body of the object according to an embodiment of the present invention.

FIG. 1 and FIG. 2 are diagrams showing an object 20, such as a piece of furniture, according to an embodiment of the present invention. In the present embodiment, the object 20 is a drawer, but the present invention is not limited thereto. Specifically, the object 20 comprises a panel 22 (such as a front plate, but the present invention is not limited thereto), a rear plate 24, a first side wall 26 (such as a left wall), a second side wall 28 (such as a right wall) and a bottom plate 30 together defining an accommodating space S. The panel 22 and the first side wall 26 (or the second side wall 28) form a furniture assembly. Furthermore, the panel 22 is configured to be connected to the first side wall 26 (or the second side wall 28) through at least one coupling device. In the present embodiment, the panel 22 is connected to the first side wall 26 and the second side wall 28 through a first coupling device 32 and a second coupling device 34 respectively. The first coupling device 32 and the second coupling device 34 are respectively arranged on a first side S1 and a second side S2 of the panel 22, and the first coupling device 32 and the second coupling device 34 are configured to be mounted to portions adjacent to front parts f of the first side wall 26 and the second side wall 28 respectively. For example, the second coupling device 34 is configured to be connected to a structural component (not shown in figures) adjacent to the front part f of the second side wall 28. Such configuration is well known to those skilled in the art. For simplification, no further illustration is provided. Moreover, the panel 22 is arranged with a supporting base 33 (as shown in FIG. 2) configured to be supported by a bottom surface of the bottom plate 30. Preferably, the supporting base 33 has a fixing member 35 configured to be fixed to the bottom surface of the bottom plate 30.

Figure 3:
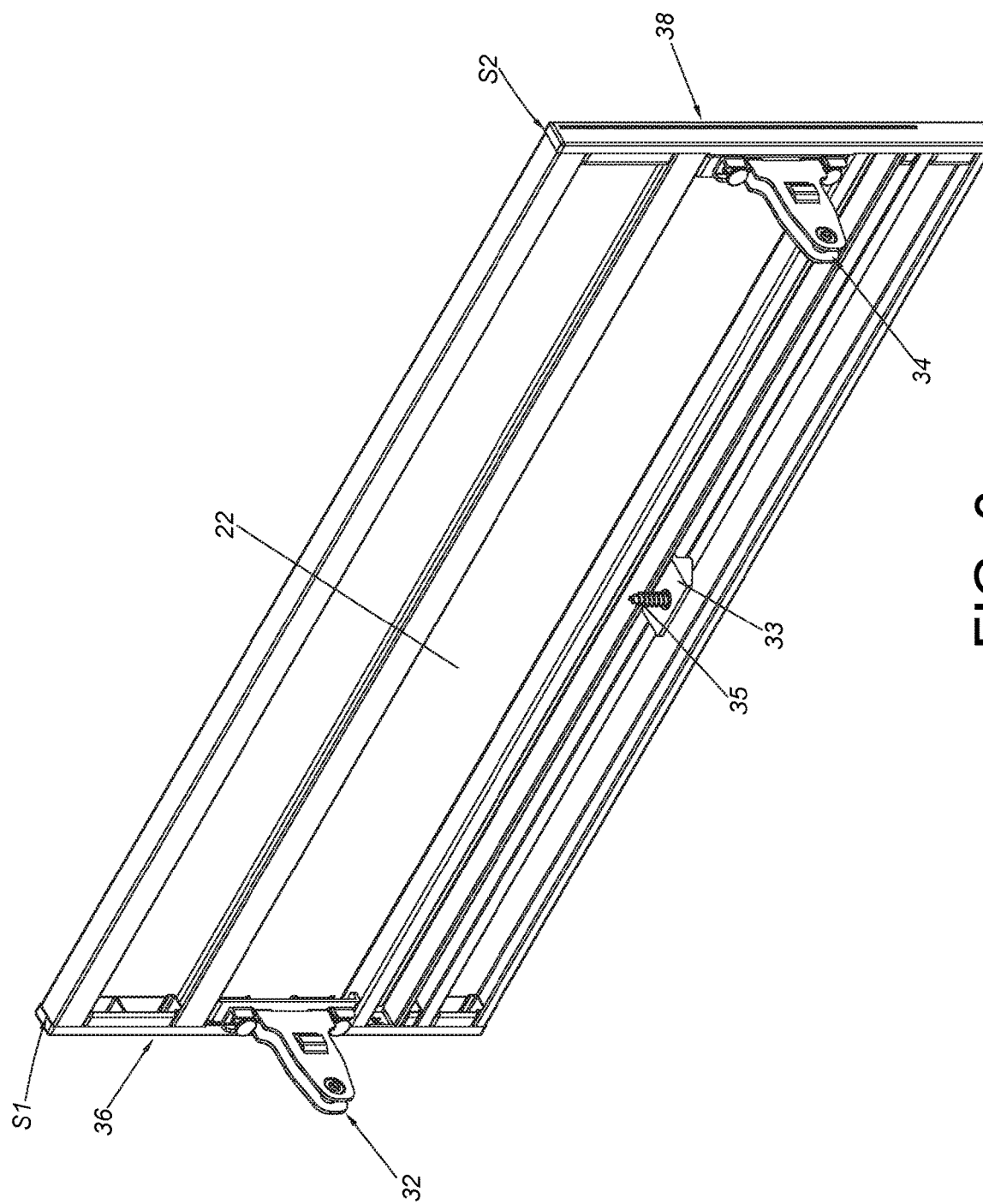
FIG. 3 is a diagram showing two sides of the panel being arranged with mounting devices respectively according to an embodiment of the present invention.
Figure 4:
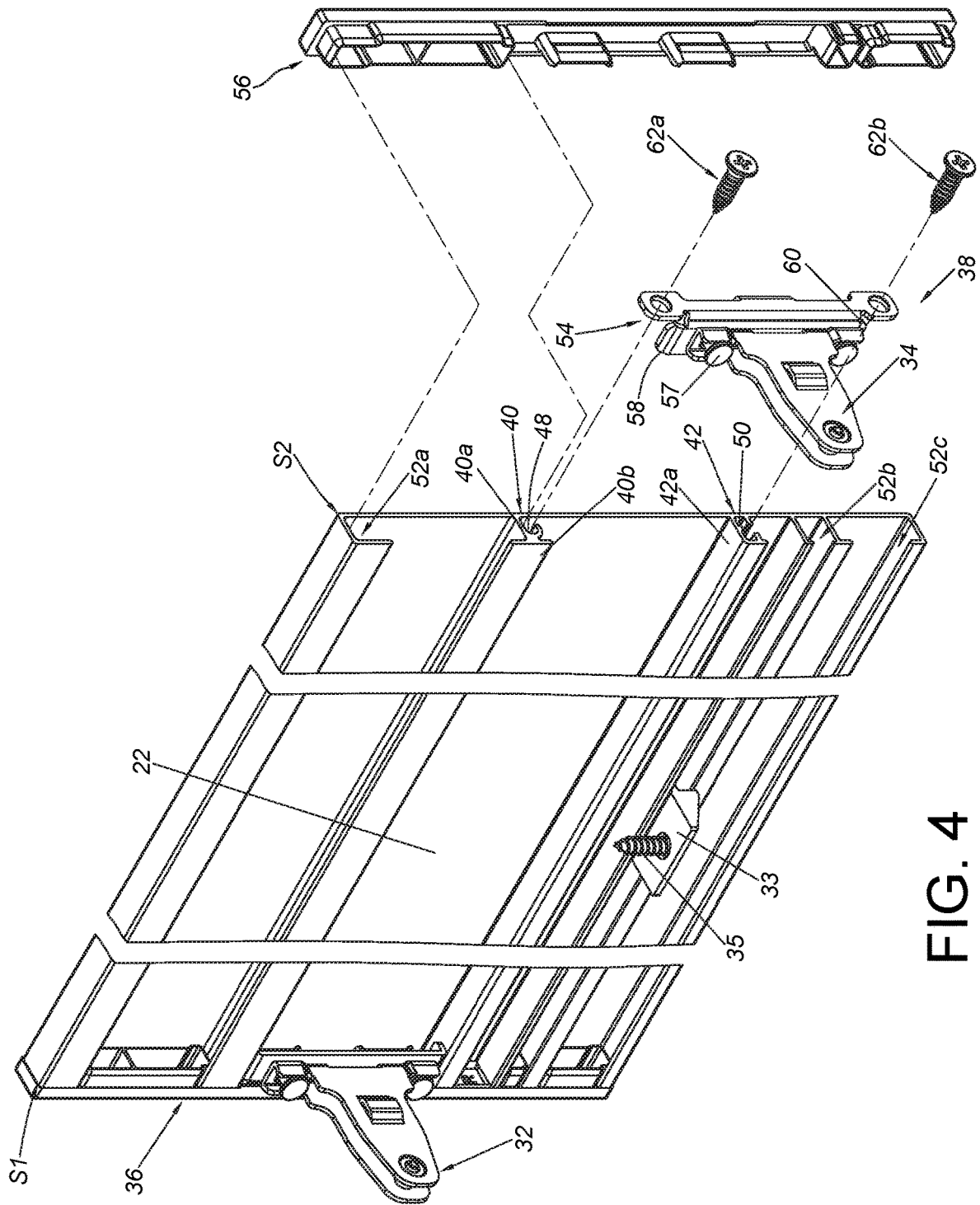
FIG. 4 is an exploded view of the panel and the mounting device according to an embodiment of the present invention.

As shown in FIG. 3 and FIG. 4, a first mounting device 36 is arranged adjacent to the first side S1 of the panel 22, and a second mounting device 38 is arranged adjacent to the second side S2 of the panel 22. The first mounting device 36 and the second mounting device 38 have substantially identical structural arrangement, and configuration of mounting the first mounting device 36 to the panel 22 is substantially identical to configuration of mounting the second mounting device 38 to the panel 22.

Figure 5:
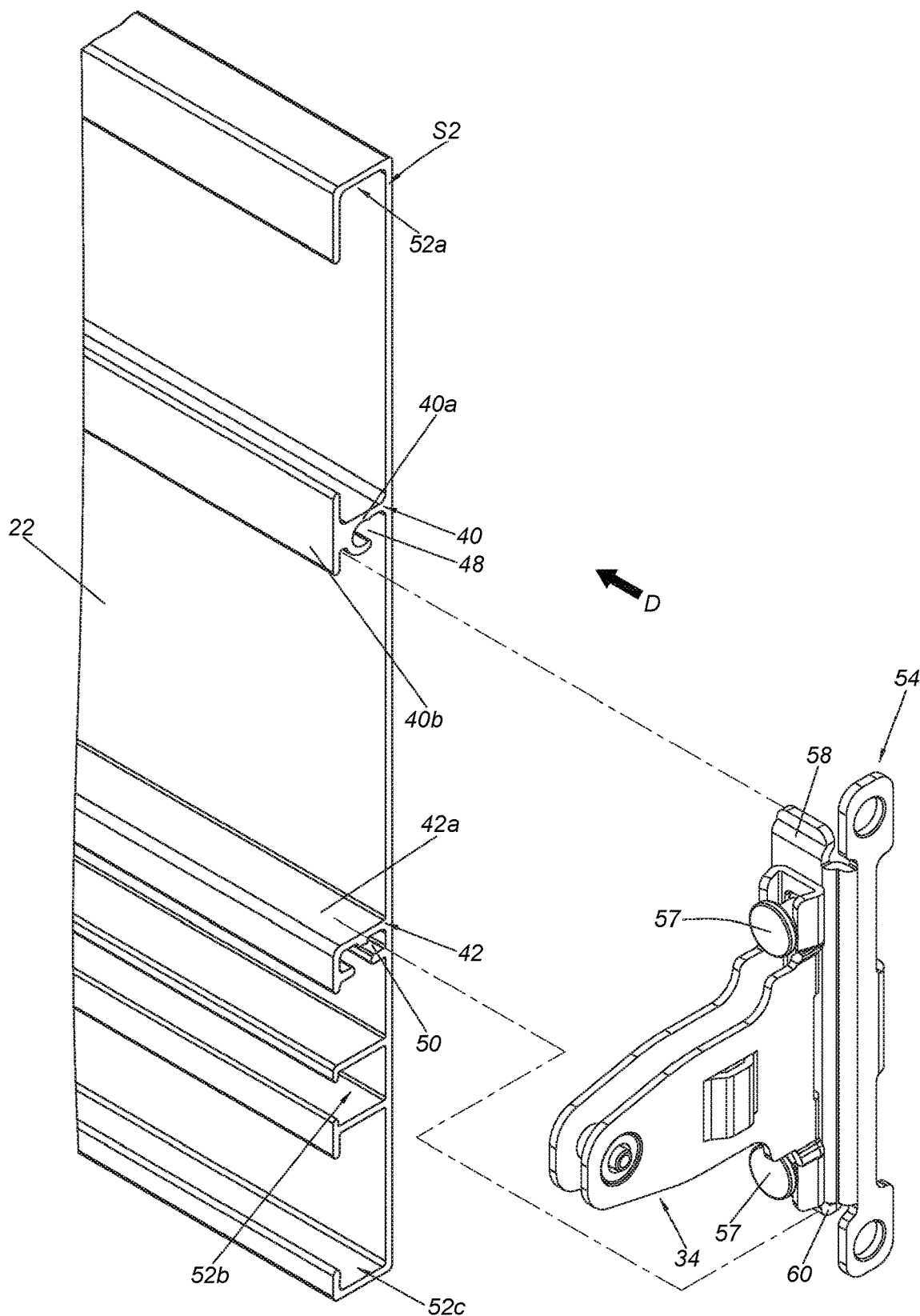
FIG. 5 is an exploded view of the panel and a mounting member of the mounting device according to an embodiment of the present invention.
Figure 6:
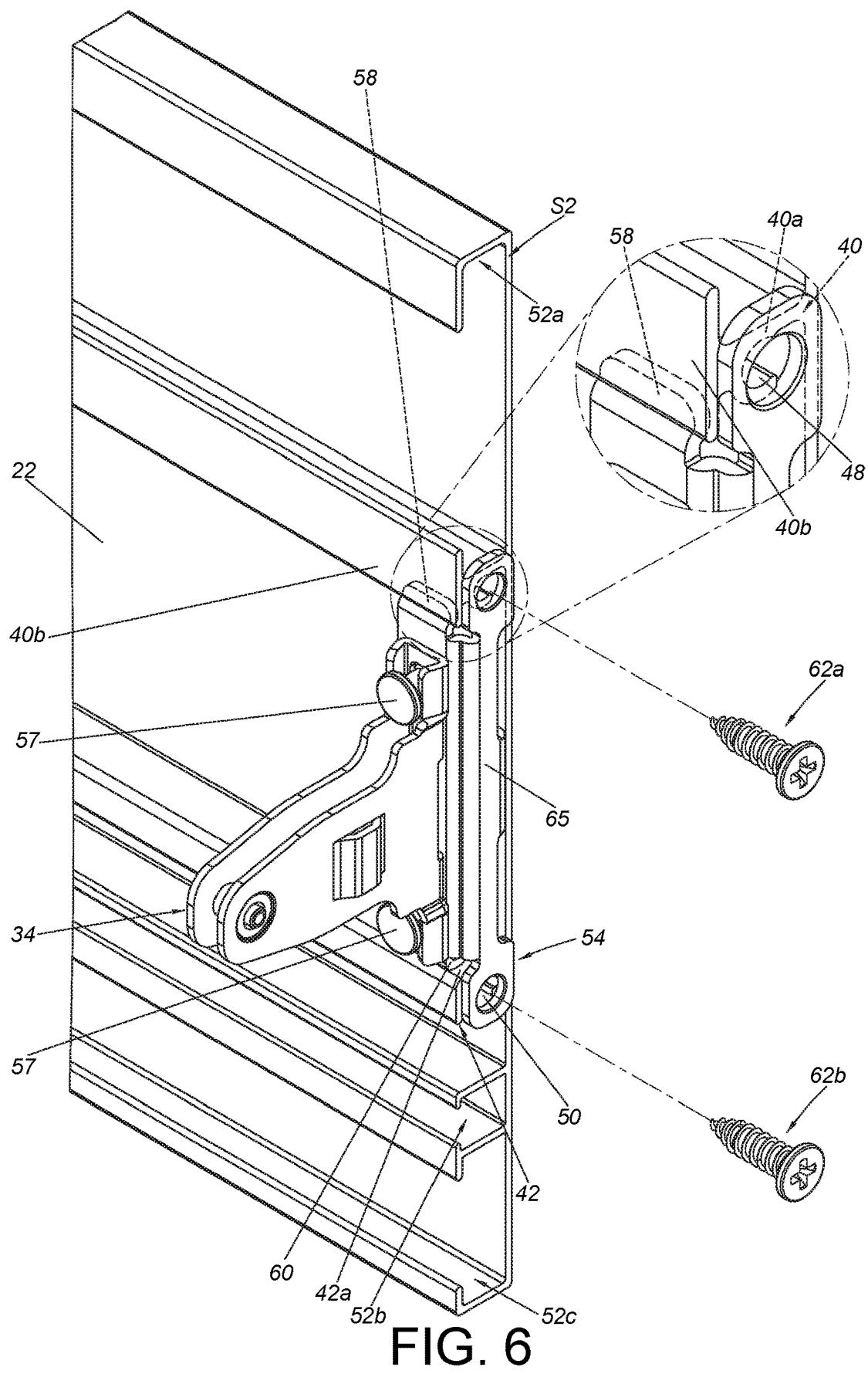
FIG. 6 is a diagram showing the mounting member being connected to the panel through at least one fastening member according to an embodiment of the present invention.

As shown in FIG. 4, FIG. 5 and FIG. 6, the panel 22 comprises a first predetermined part 40 and a second predetermined part 42 extended transversely. The first predetermined part 40 comprises an extended section 40a and a supporting section 40b. The extended section 40a is extended from the panel 22. The supporting section 40b is located adjacent to the extended section 40a.

Preferably, the extended section 40a is substantially perpendicularly connected to the panel 22, and the supporting section 40b is substantially perpendicularly connected to the extended section 40a to form a lower wall extended toward the second predetermined part 42.

Preferably, the second predetermined part 42 is provided with a transversely-extended supporting surface 42a corresponding to the first predetermined part 40.

Preferably, the extended section 40a of the first predetermined part 40 of the panel 22 is arranged with a first corresponding feature 48 located adjacent to the second side S2 of the panel 22, and the second predetermined part 42 of the panel 22 is arranged with a second corresponding feature 50 located adjacent to the second side S2 of the panel 22.

Preferably, the panel 22 further comprises at least one mounting part, such as a first mounting part 52a, a second mounting part 52b and a third mounting part 52c arranged from a top portion to a bottom portion of the panel 22. In the present invention, the mounting parts 52a, 52b, 52c are formed with grooves defined by a plurality of bending sections of the panel 22, and the grooves is communicated with the first side S1 and the second side S2 of the panel 22, but the present invention is not limited thereto.

Furthermore, each of the mounting devices 36, 38 comprises a mounting member and an auxiliary member. For example, the second mounting device 38 comprises a mounting member 54 and an auxiliary member 56 in the present embodiment. Preferably, the mounting member 54 and the auxiliary member 56 are configured to be mounted to the panel 22 in sequence.

For example, the mounting member 54 is configured to be mounted to the second side S2 of the panel 22 along a direction D. The mounting member 54 is arranged with the second coupling device 34, and the second coupling device 34 is longitudinally fixedly connected to the mounting member 54 through at least one connecting feature 57 (such as a rivet or a screw, but the present invention is not limited thereto). The mounting member 54 comprises a first supporting part 58 and a second supporting part 60. The first supporting part 58 is configured to abut against the first predetermined part 40 of the panel 22. In the present embodiment, the first supporting part 58 is configured to abut against the supporting section 40b of the panel 22 (as shown in FIG. 6), but the present invention is not limited thereto. On the other hand, the supporting surface 42a of the second predetermined part 42 of the panel 22 is configured to support the second supporting part 60 (as shown in FIG. 6). According to such arrangement, the mounting member 54 is configured to be supported on the second side S2 of the panel 22 in advance (as shown in FIG. 6), such that the mounting member 54 can be temporarily held on the second side S2 of the panel 22.

Figure 7:
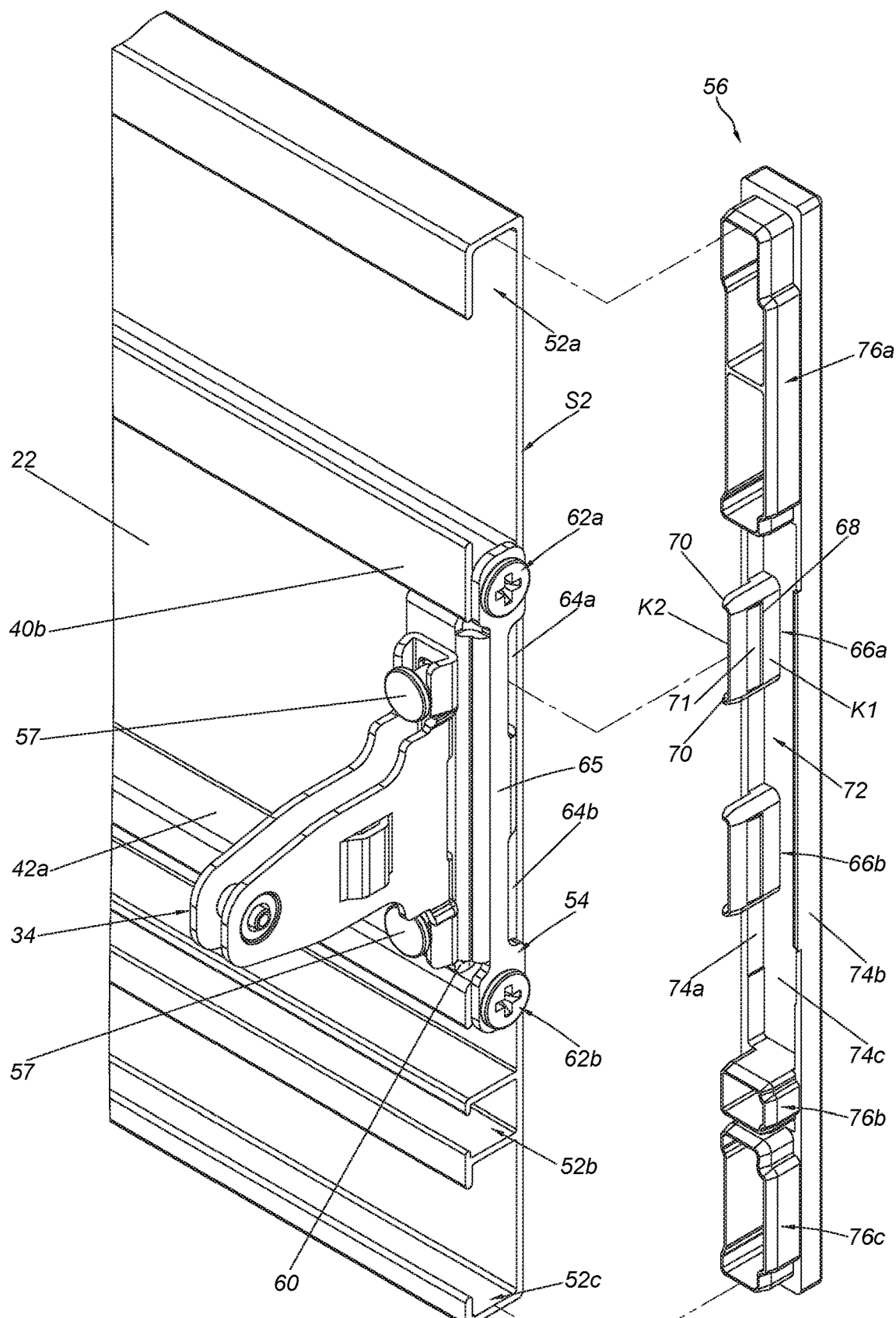
FIG. 7 is an exploded view of the panel connected with the mounting member and an auxiliary member of the mounting device from a first viewing angle according to an embodiment of the present invention.

As shown in FIG. 6 and FIG. 7, after the mounting member 54 is supported on the second side S2 of the panel 22 in advance, at least one fastening member, such as a first fastening member 62a and a second fastening member 62b, are configured to pass through at least one predetermined portion 65 of the mounting member 54 to fixedly connect the mounting member 54 to the second side S2 of the panel 22. Moreover, the first fastening member 62*a* is configured to fasten the mounting member 54 to the first corresponding feature 48 of the first predetermined part 40 of the panel 22. Similarly, the second fastening member 62*b* is configured to fasten the mounting member 54 to the second corresponding feature 50 of the second predetermined part 42 of the panel 22.

Preferably, the first fastening member 62*a* is transversely fastened to the first corresponding feature 48, and the second fastening member 62*b* is transversely fastened to the second corresponding feature 50.

Preferably, the mounting member 54 has at least one notch, such as a first notch 64*a* and a second notch 64*b*.

Figure 8:
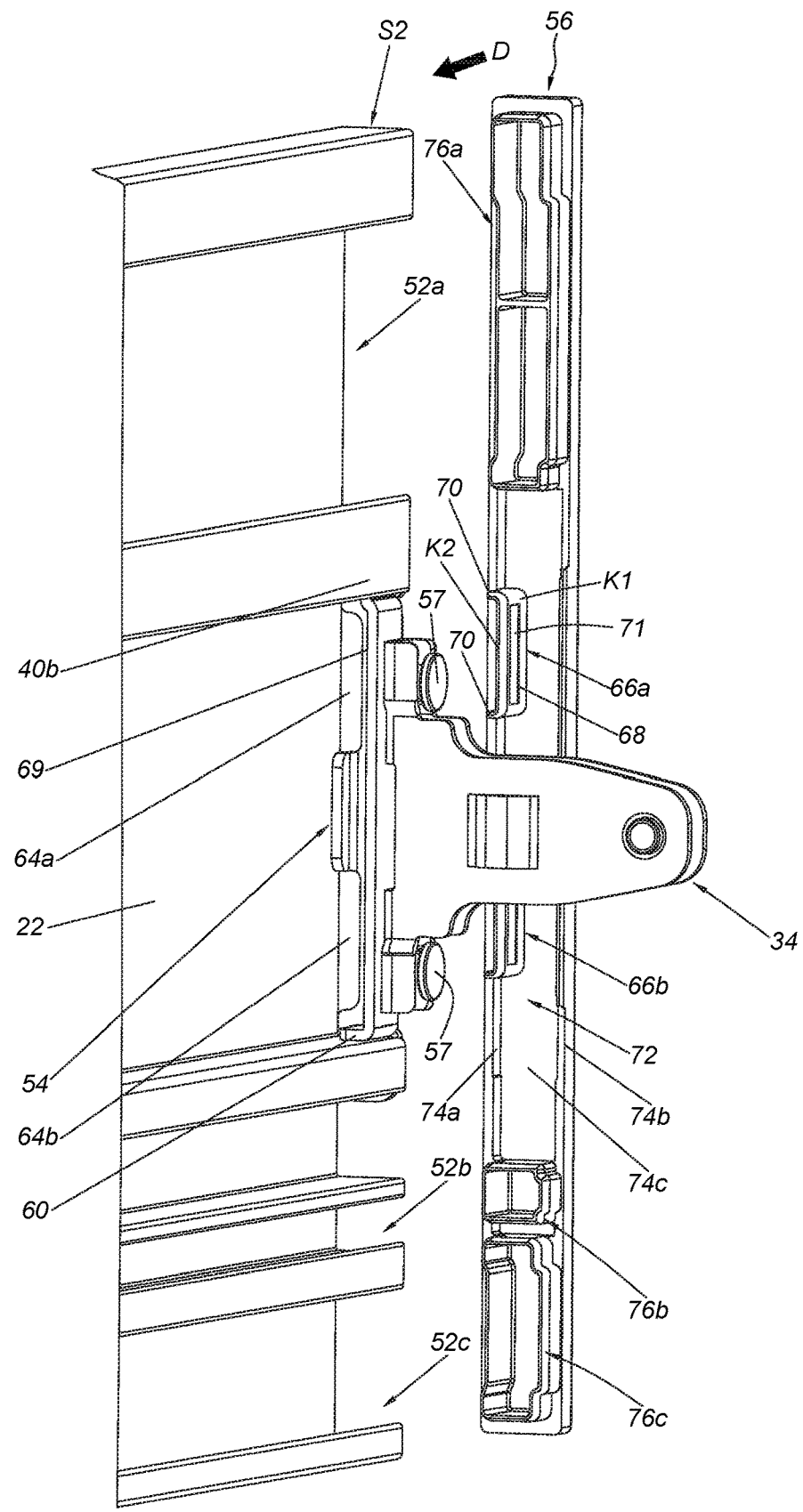
FIG. 8 is an exploded view of the panel connected with the mounting member and the auxiliary member of the mounting device from a second viewing angle according to an embodiment of the present invention.
Figure 9:
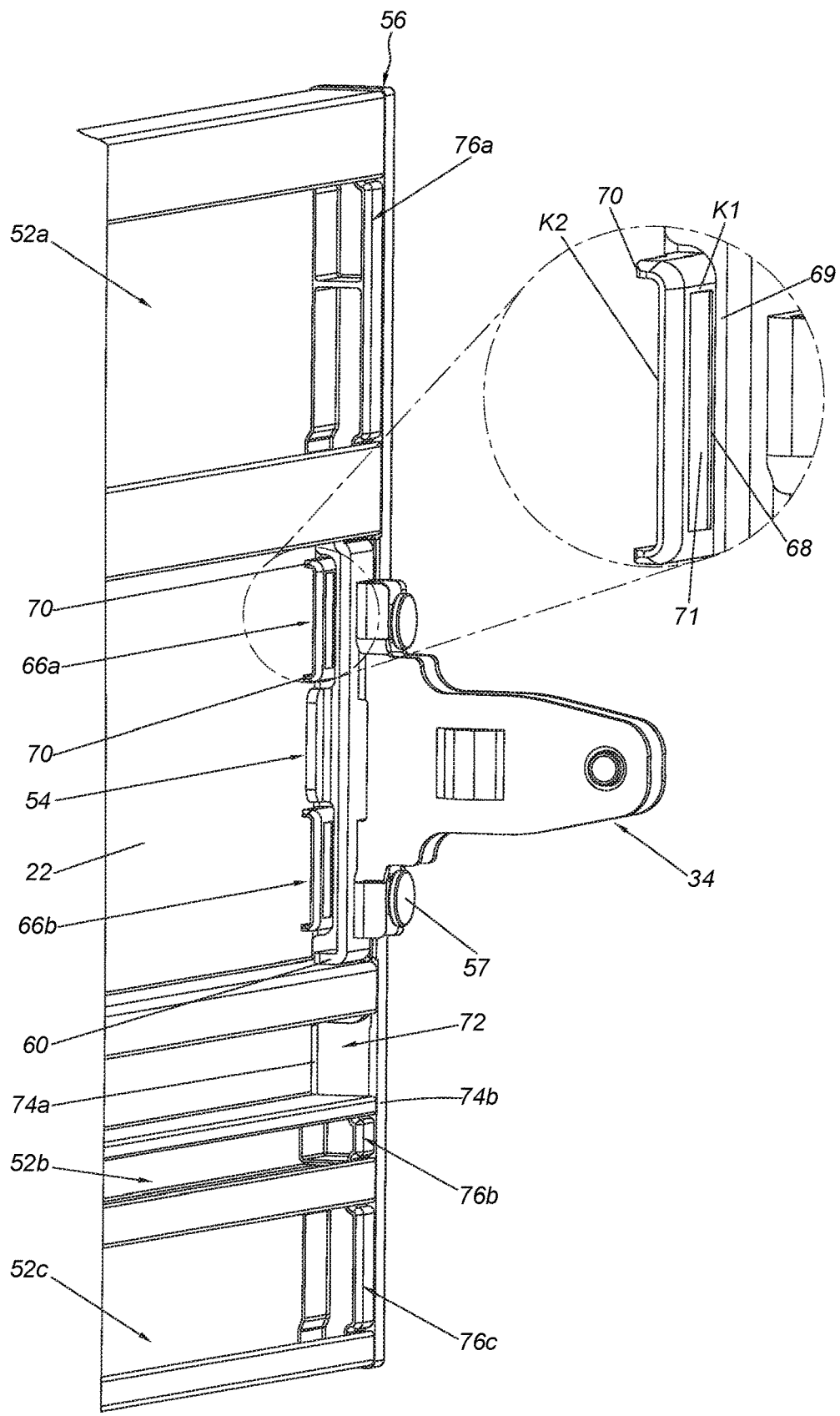
FIG. 9 is a diagram showing the panel connected with the mounting member and the auxiliary member of the mounting device being mounted to each other from the second viewing angle according to an embodiment of the present invention.

As shown in FIG. 7, FIG. 8 and FIG. 9, after the mounting member 54 is mounted to the panel 22, the auxiliary member 56 is configured to be connected to at least one of the mounting member 54 and the panel 22 along the direction D, and the auxiliary member 56 is configured to cover the at least one predetermined portion 65 of the mounting member 54. In the present embodiment, after the mounting member 54 is mounted to the panel 22, the auxiliary member 56 can cover the at least one predetermined portion 65 of the mounting member 54 and shield the first fastening member 62*a* and the second fastening member 62*b*, and the auxiliary member 56 can also cover the entire second side S2 of the panel 22 (please refer to FIG. 2), but the present invention is not limited thereto.

The auxiliary member 56 comprises at least one flexible part, such as a first flexible part 66*a* and a second flexible part 66*b*. The first flexible part 66*a* and the second flexible part 66*b* have substantially identical structural arrangement. In the present embodiment, the first flexible part 66*a* is illustrated as an example. Moreover, the first flexible part 66*a* has a first surface and a second surface K2 opposite to the first surface K1. The first surface K1 is arranged a buckling section 68 (such as being located at one side of a protruding structure), and the second surface K2 is arranged with at least one holding section 70 (such as a protruding rib, but the present invention is not limited thereto). After the first flexible part 66*a* is inserted into the first notch 64*a* of the mounting member 54 along the direction D (as shown in FIG. 8 and FIG. 9), the buckling section 68 of the first surface K1 is configured to buckle (or hook) a wall surface 69 of the mounting member 54, in order to prevent the auxiliary member 56 from being detached from the mounting member 54 along a direction opposite to the direction D, and the at least one holding section 70 on the second surface K2 of the first flexible part 66*a* is configured to abut against (or contact) a surface of the panel 22, so as to push and press the auxiliary member 56 to attach tightly between the mounting member 54 and the panel 22 (as shown in FIG. 9). Similarly, the second flexible part 66*b* is configured to be inserted into the second notch 64*b* of the mounting member 54. For simplification, no further illustration is provided.

Preferably, a guiding feature 71 is arranged at the other side of the protruding structure adjacent to the buckling section 68, in order to guide the wall surface 69 of the mounting member 54 to cross the protruding structure to allow the buckling section 68 to buckle the wall surface 69 of the mounting member 54 (as shown in FIG. 9). The guiding feature 71 can be an inclined surface or an arc surface. Preferably, the buckling section 68 and the guiding feature 71 are located at two opposite sides of the protruding structure.

Preferably, the auxiliary member 56 is formed with a mounting space 72 (as shown in FIG. 7) configured to accommodate the at least one predetermined portion 65 of the mounting member 54. For example, the auxiliary member 56 comprises a first wall 74*a*, a second wall 74*b* and a third wall 74*c* connected between the first wall 74*a* and the second wall 74*b*, and the mounting space 72 is defined by the first wall 74*a*, the second wall 74*b* and the third wall 74*c*. The first flexible part 66*a* and the second flexible part 66*b* are arranged on the third wall 74*c*.

Preferably, the auxiliary member 56 further comprises at least one connecting part, such as a first connecting part 76*a*, a second connecting part 76*b* and a third connecting part 76*c* which are arranged from a top portion to a bottom portion of the auxiliary member 56. In the present embodiment, the first connecting part 76*a*, the second connecting part 76*b* and the third connecting part 76*c* are protrusions, and are arranged on the third wall 74*c* to be correspondingly connected to the first mounting part 52*a*, the second mounting part 52*b* and the third mounting part 52*c* of the panel 22.

According to an embodiment of the present invention, a mounting method for furniture assembly comprises the following steps: providing the mounting member 54 mounted to one side (such as the second side S2) of the panel 22, and the mounting member 54 being arranged with at least one coupling device (such as the second coupling device 34); providing the auxiliary member 56 configured to cover the mounting member 54 and the side of the panel 22; and mounting the panel 22 to a wall (such as the second side wall 28) through the at least one coupling device (such as the second coupling device 34). Such steps in the mounting method have been illustrated above. For simplification, no further illustration is provided.

Therefore, the mounting device and mounting method for furniture assembly according to the embodiments of the present invention is characterized in that:

1. The first supporting part 58 of the mounting member 54 is configured to abut against the first predetermined part 40 of the panel 22, and the second supporting part 60 of the mounting member 54 is configured to be supported by the second predetermined part 42 of the panel 22. According to such arrangement, the mounting member 54 can be temporarily held on one side (such as the first side S1 or the second side S2) of the panel 22, so as to assist in connecting (such as fixedly connecting) the mounting member 54 to the panel 22 through the at least one fastening member (such as the first fastening member 62*a*).

2. The auxiliary member 56 is configured to be connected to at least one of the mounting member 54 and the panel 22, and the auxiliary member 56 is configured to cover the at least one predetermined portion 65 of the mounting member 54. Preferably, the auxiliary member 56 can also cover the side (such as the first side S1 or the second side S2) of the panel 22. Accordingly, the auxiliary member 56 can provide protecting effect to the mounting member 54, and the auxiliary member 56 can also be used as a decorative cover for the side of the panel 22.

3. The mounting member 54 is transversely connected to the side (such as the first side S1 or the second side S2) of the panel 22 through the at least one fastening member.

4. The first fastening member 62*a* and the second fastening member 62*b* are not exposed from an inner side of the panel 22 of the drawer.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A furniture assembly, comprising:
a panel comprising a first predetermined part and a second predetermined part, wherein the first predetermined part comprises an extended section and a supporting section, the extended section is extended from the panel, and the supporting section is located adjacent to the extended section;
a mounting member configured to be mounted to the panel, the mounting member comprising a first supporting part and a second supporting part, wherein the first supporting part is configured to abut against the supporting section of the first predetermined part of the panel, and the second predetermined part of the panel has a supporting surface configured to support the second supporting part;
at least one fastening member configured to connect the mounting member to the panel, and
an auxiliary member configured to be connected to at least one of the mounting member and the panel, wherein the auxiliary member and the mounting member form a mounting device, the auxiliary member comprises at least one flexible part having a first surface and a second surface opposite to the first surface, the first surface is arranged with a buckling section configured to buckle the mounting member, and the second surface is arranged with a holding section configured to abut against the panel.

2. The furniture assembly of claim 1, wherein the at least one fastening member comprises a first fastening member, and the extended section of the first predetermined part of the panel is arranged with a first corresponding feature configured to fasten the first fastening member to one side of the panel.

3. The furniture assembly of claim 2, wherein the at least one fastening member further comprises a second fastening member, and the second predetermined part of the panel is arranged with a second corresponding feature configured to fasten the second fastening member to the side of the panel.

4. The furniture assembly of claim 2, wherein the first fastening member is transversely fastened to the first corresponding feature.

5. The furniture assembly of claim 3, wherein the second fastening member is transversely fastened to the second corresponding feature.

6. The furniture assembly of claim 4, further comprising a furniture side wall and at least one coupling device longitudinally connected to the mounting member, wherein the at least one coupling device is configured to connect the panel to the furniture side wall.

7. The furniture assembly of claim 3, wherein the supporting surface of the second predetermined part is transversely arranged on the panel.

8. The furniture assembly of claim 1, wherein the auxiliary member is formed with a mounting space configured to accommodate at least one predetermined portion of the mounting member.

9. The furniture assembly of claim 8, wherein the auxiliary member comprises a plurality of walls defining the mounting space, and the at least one flexible part is arranged on one of the walls.

10. The furniture assembly of claim 9, wherein the panel further comprises at least one mounting part, and the auxiliary member further comprises at least one connecting part configured to be correspondingly connected to the at least one mounting part.

* * * * *